(12) United States Patent
Padwa

(10) Patent No.: US 7,718,720 B2
(45) Date of Patent: May 18, 2010

(54) NUCLEATING AGENTS

(75) Inventor: Allen R. Padwa, Worcester, MA (US)

(73) Assignee: Metabolix Inc., Cambridge, MA (US)

( * ) Notice: Subject to any disclaimer, the term of this patent is extended or adjusted under 35 U.S.C. 154(b) by 1014 days.

(21) Appl. No.: 11/022,954

(22) Filed: Dec. 27, 2004

(65) Prior Publication Data

US 2005/0209377 A1    Sep. 22, 2005

Related U.S. Application Data

(60) Provisional application No. 60/533,640, filed on Dec. 30, 2003.

(51) Int. Cl.
*C08K 5/3492* (2006.01)
*C08L 67/00* (2006.01)

(52) U.S. Cl. ............... 524/100; 524/99; 524/101; 524/601; 524/604; 524/605

(58) Field of Classification Search ............... 524/100, 524/101, 99
See application file for complete search history.

(56) References Cited

U.S. PATENT DOCUMENTS

| | | | |
|---|---|---|---|
| 3,563,971 A | 2/1971 | Wood et al. | |
| 4,076,910 A | 2/1978 | Beck | 526/6 |
| 4,463,113 A | 7/1984 | Nakahara et al. | 524/117 |
| 4,946,930 A | 8/1990 | Takasa et al. | |
| 5,342,868 A | 8/1994 | Kimura et al. | 524/108 |
| 5,516,565 A * | 5/1996 | Matsumoto | 428/35.7 |
| 5,693,285 A | 12/1997 | Ishii et al. | |
| 5,973,100 A | 10/1999 | Asrar et al. | 528/176 |
| 6,423,250 B1 * | 7/2002 | Blount | 252/607 |
| 6,515,054 B1 | 2/2003 | Matsushita et al. | |
| 6,585,819 B2 | 7/2003 | Zhao | 106/162.1 |
| 7,361,701 B2 * | 4/2008 | Takahashi et al. | 524/86 |

FOREIGN PATENT DOCUMENTS

| | | |
|---|---|---|
| DE | 19750371 A1 | 5/1999 |
| EP | 0300480 A | 1/1989 |
| FR | 2656620 A | 7/1991 |
| JP | 06-340786 A | 12/1994 |
| JP | 2003-192884 A | 7/2003 |
| WO | WO 02/085983 A1 | 10/2002 |
| WO | WO 02/094759 A1 | 11/2002 |

* cited by examiner

*Primary Examiner*—Vickey Nerangis
(74) *Attorney, Agent, or Firm*—Foley & Lardner LLP

(57) ABSTRACT

Nucleants and related compositions, articles, and methods are described.

20 Claims, No Drawings

NUCLEATING AGENTS

CROSS-REFERENCE TO RELATED APPLICATIONS

This application claims priority to U.S. Provisional Patent Application Ser. No. 60/533,640, filed Dec. 30, 2003, and entitled "Nucleating Agents." The contents of the provisional application are incorporated herein by reference in their entireties. This application also herein incorporates by reference the entire disclosures of U.S. patent application Ser. No. 10/783,995, filed on Feb. 20, 2004.

TECHNICAL FIELD

The invention relates to nucleants, thermoplastics compositions that include such nucleants, and related methods and articles.

BACKGROUND

Thermoplastics can be used to fabricate a wide array of products. When preparing semicrystalline thermoplastics for processing, it is often desirable to add a nucleant to the semicrystalline thermoplastic to manipulate the rate at which the thermoplastic crystallizes. By manipulating the crystallization rate, the rate at which the thermoplastic loses tackiness, as well as the mechanical strength of the finished thermoplastic, can be controlled.

SUMMARY

The invention relates to nucleants, thermoplastics compositions that include such nucleants, and related methods and articles.

In one aspect, the invention features a composition that includes a thermoplastic polyester or polyolefin and a nucleant. The nucleant can include a compound that includes a nitrogen-containing heteroaromatic core.

Embodiments can include one or more of the following features.

The nitrogen-containing heteroaromatic core can be pyridine, pyrimidine, pyrazine, pyridazine, triazine, or imidazole.

The compound can have a chemical formula of Formula 1, Formula 2, Formula 3, Formula 4, Formula 5, or Formula 6 (all of which are described in detail below) and combinations thereof, wherein each R1 is independently H, $NR^2R^2$, OH, $OR^2$, $SR^2$, $SOR^2$, $SO_2R^2$, CN, $COR^2$, $CO_2R^2$, $CONR^2R^2$, $NO_2$, F, Cl, Br, or I; and each $R^2$ is independently H or $C_1$-$C_6$ alkyl.

The composition can include a thermoplastic polyester.

The thermoplastic polyester can include an aliphatic polyester.

The aliphatic polyester can be selected from the group consisting of polybutylene succinates, polycaprolactones, polyhydroxyalkanoates, polyglycolic acids, polylactic acids, and combinations thereof.

The aliphatic polyester can include a polyhydroxyalkanoate.

The polyhydroxyalkanoate can be a polyhydroxyalkanoate homopolymer selected from the group consisting of poly-3-hydroxybutyrate, polylactic acid, polyglycolic acid, and poly-4-hydroxybutyrate.

The polyhydroxyalkanoate can be a copolymer of 3-hydroxybutyrate and at least one co-monomer selected from the group consisting of 3-hydroxypropionate, 3-hydroxyvalerate, 3-hydroxyhexanoate, 3-hydroxyheptanoate, 3-hydroxyoctanoate, 3-hydroxynonaoate, 3-hydroxydecanoate, 3-hydroxydodecanoate, 3-hydroxydodecenoate, 3-hydroxytetradecanoate, 3-hydroxyhexadecanoate, 3-hydroxyoctadecanoate, 3-hydroxy-4-pentenoate, 4-hydroxybutyrate, 4-hydroxyvalerate, 5-hydroxyvalerate, and 6-hydroxyhexanoate.

The copolymer can be poly 3-hydroxybutyrate-co-3-hydroxypropionate, poly 3-hydroxybutyrate-co-4-hydroxybutyrate, poly 3-hydroxybutyrate-co-3-hydroxyvalerate, poly 3-hydroxybutyrate-co-3-hydroxyhexanoate, poly 3-hydroxybutyrate-co-3-hydroxyvalerate-co-3-hydroxyhexanoate, or poly 3-hydroxybutyrate-co-3-hydroxyhexanoate-co-3-hydroxyoctanoate-co-3-hydroxydecanoate-co-3-hydroxydodecanotate-co-3-hydroxydodecenotate.

The 3-hydroxybutyrate can be present in the copolymer in a range of about 60 to 98 weight percent, about 70 to 98 weight percent, about 80 to 98 weight percent, or about 90 to 98 weight percent.

The aliphatic polyester can include polybutylene succinate or polybutylene succinate adipate.

The thermoplastic polyester can include an aromatic polyester.

The aromatic polyester can include a polyethylene terephthalate.

The polyethylene terephthalate can include a co-monomer.

The co-monomer can be an ether or amide or aliphatic monomer.

The aromatic polyester can be a polybutylene adipate/terephthalate or a polymethylene adipate/terephthalate.

The nucleant can include cyanuric acid.

The composition can include a polyolefin.

The polyolefin can be a polyethylene, polypropylene, or polybutylene.

In another aspect, the invention features an article that includes a composition that includes a thermoplastic polyester or polyolefin, and a nucleant. The nucleant includes a compound that includes a nitrogen-containing heteroaromatic core.

In embodiments, the article can be in the form of a fiber, filament, rod, tube, or film.

In another aspect, the invention features a process that includes forming an article from a composition that includes a thermoplastic polyester or polyolefin, and a nucleant. The nucleant includes a compound that includes a nitrogen-containing heteroaromatic core.

In embodiments, forming the article comprises molding or extruding the composition.

In another aspect, the invention features an article made by a process that includes forming an article from a composition that includes a thermoplastic polyester or polyolefin, and a nucleant. The nucleant includes a compound that includes a nitrogen-containing heteroaromatic core.

In another aspect, the invention features a composition that includes at least one type of thermoplastic polyester and a nucleant comprising a compound of Formula 7 (described below), wherein $R_1$ is a hydrogen atom or an alkyl group having 1 to 4 carbon atoms, $R_2$ and $R_3$ are each a hydrogen atom or an alkyl group having 1 to 12 carbon atoms, M is a group III or IV metal atom, and X is HO, O═, or $(HO)_2$. The composition can be substantially devoid of alkali-metal carboxylates, alkali metal β-diketonates, alkali metal salts of β-ketoacetic esters, and polyethylene terephthalates.

Embodiments can include one or more of the following features.

X can be OH, M can be Al, $R_1$ can be H, $R_2$ can be t-$C_4H_9$, and $R_3$ can be t-$C_4H_9$.

The thermoplastic polyester can be an aliphatic polyester.

The aliphatic polyester can be selected from the group consisting of polybutylene succinates, polycaprolactones, polyhydroxyalkanoates, polyglycolic acids, polylactic acids, and combinations thereof.

The aliphatic polyester can be a polyhydroxyalkanoate.

The polyhydroxyalkanoate can be a polyhydroxyalkanoate homopolymer selected from the group consisting of poly-3-hydroxybutyrate, polylactic acid, polyglycolic acid and poly-4-hydroxybutyrate.

The polyhydroxyalkanoate can be a copolymer of 3-hydroxybutyrate and at least one co-monomer selected from the group consisting of 3-hydroxypropionate, 3-hydroxyvalerate, 3-hydroxyhexanoate, 3-hydroxyheptanoate, 3-hydroxyoctanoate, 3-hydroxynonaoate, 3-hydroxydecanoate, 3-hydroxydodecanoate, 3-hydroxydodecenoate, 3-hydroxytetradecanoate, 3-hydroxyhexadecanoate, 3-hydroxyoctadecanoate, 3-hydroxy-4-pentenoate, 4-hydroxybutyrate, 4-hydroxyvalerate, 5-hydroxyvalerate, and 6-hydroxyhexanoate.

The copolymer can be poly 3-hydroxybutyrate-co-3-hydroxypropionate, poly 3-hydroxybutyrate-co-4-hydroxybutyrate, poly 3-hydroxybutyrate-co-3-hydroxyvalerate, poly 3-hydroxybutyrate-co-3-hydroxyhexanoate, poly 3-hydroxybutyrate-co-3-hydroxyvalerate-co-3-hydroxyhexanoate, or poly 3-hydroxybutyrate-co-3-hydroxyhexanoate-co-3-hydroxyoctanoate-co-3-hydroxydecanoate-co-3-hydroxydodecanotate-co-3-hydroxydodecenotate.

The 3-hydroxybutyrate can be present in the copolymer in a range of about 60 to 98 weight percent, about 70 to 98 weight percent, about 80 to 98 weight percent, or about 90 to 98 weight percent.

The aliphatic polyester can include polybutylene succinate or polybutylene succinate adipate.

The thermoplastic polyester can include an aromatic polyester.

In another aspect, the invention features an article comprising a composition that includes at least one type of thermoplastic polyester and a nucleant comprising a compound of Formula 7, wherein $R_1$ is a hydrogen atom or an alkyl group having 1 to 4 carbon atoms, $R_2$ and $R_3$ are each a hydrogen atom or an alkyl group having 1 to 12 carbon atoms, M is a group III or IV metal atom, and X is HO, O=, or (HO)$_2$. The composition can be substantially devoid of alkali-metal carboxylates, alkali metal β-diketonates, alkali metal salts of β-ketoacetic esters, and polyethylene terephthalates.

In embodiments, the article can be in the form of a fiber, filament, rod, tube, or film.

In another aspect, the invention features a process that includes forming an article from a composition that includes at least one type of thermoplastic polyester and a nucleant comprising a compound of Formula 7, wherein $R_1$ is a hydrogen atom or an alkyl group having 1 to 4 carbon atoms, $R_2$ and $R_3$ are each a hydrogen atom or an alkyl group having 1 to 12 carbon atoms, M is a group III or IV metal atom, and X is HO, O=, or (HO)$_2$. The composition can be substantially devoid of alkali-metal carboxylates, alkali metal β-diketonates, alkali metal salts of β-ketoacetic esters, and polyethylene terephthalates.

In embodiments, forming the article can include molding or extruding the composition.

In still another aspect, the invention features an article made by a process that includes forming an article from a composition that includes at least one type of thermoplastic polyester and a nucleant comprising a compound of Formula 7, wherein $R_1$ is a hydrogen atom or an alkyl group having 1 to 4 carbon atoms, $R_2$ and $R_3$ are each a hydrogen atom or an alkyl group having 1 to 12 carbon atoms, M is a group III or IV metal atom, and X is HO, O=, or (HO)$_2$. The composition can be substantially devoid of alkali-metal carboxylates, alkali metal β-diketonates, alkali metal salts of β-ketoacetic esters, and polyethylene terephthalates.

In yet another aspect, the invention features a method of fabricating a thermoplastic composition. The method includes contacting a thermoplastic polyester with a nucleant. The nucleant includes a compound that includes a nitrogen-containing heteroaromatic core.

Embodiments can include one or more of the following features.

The nitrogen-containing heteroaromatic core can be a pyridine, pyrimidine, pyrazine, pyridazine, triazine, or imidazole.

The compound can have a chemical formula of Formula 1, Formula 2, Formula 3, Formula 4, Formula 5, or Formula 6 (all of which are described in detail below) and combinations thereof, wherein each R1 is independently H, $NR^2R^2$, OH, $OR^2$, $SR^2$, $SOR^2$, $SO_2R^2$, CN, $COR^2$, $CO_2R^2$, $CONR^2R^2$, $NO_2$, F, Cl, Br, or I; and each $R^2$ is independently H or $C_1$-$C_6$ alkyl.

The nucleant can include cyanuric acid.

In an additional aspect, the invention features a method of fabricating a thermoplastic composition. The method includes contacting a thermoplastic polyester having a melting temperature at or below about 260° C., e.g., at or below about 250° C., or at or below about 200° C., or in a range of about 240-260° C., with methylbenzylidene sorbitol or dimethylbenzylidene sorbitol dissolved in a solvent; melting the thermoplastic polyester at or below about 260° C., e.g., at or below about 250° C., or at or below about 200° C., or in a range of about 240-260° C.; and cooling the thermoplastic polyester, to thereby fabricate the thermoplastic composition.

Embodiments can include one or more of the following features.

The thermoplastic polyester can be a polyhydroxyalkanoate.

The polyhydroxyalkanoate can be a polyhydroxyalkanoate homopolymer selected from the group consisting of poly-3-hydroxybutyrate, polylactic acid, polyglycolic acid and poly-4-hydroxybutyrate.

The polyhydroxyalkanoate can be a copolymer of 3-hydroxybutyrate and at least one co-monomer selected from the group consisting of 3-hydroxypropionate, 3-hydroxyvalerate, 3-hydroxyhexanoate, 3-hydroxyheptanoate, 3-hydroxyoctanoate, 3-hydroxynonaoate, 3-hydroxydecanoate, 3-hydroxydodecanoate, 3-hydroxydodecenoate, 3-hydroxytetradecanoate, 3-hydroxyhexadecanoate, 3-hydroxyoctadecanoate, 3-hydroxy-4-pentenoate, 4-hydroxybutyrate, 4-hydroxyvalerate, 5-hydroxyvalerate, and 6-hydroxyhexanoate.

The copolymer can be poly 3-hydroxybutyrate-co-3-hydroxypropionate, poly 3-hydroxybutyrate-co-4-hydroxybutyrate, poly 3-hydroxybutyrate-co-3-hydroxyvalerate, poly 3-hydroxybutyrate-co-3-hydroxyhexanoate, poly 3-hydroxybutyrate-co-3-hydroxyvalerate-co-3-hydroxyhexanoate, or poly 3-hydroxybutyrate-co-3-hydroxyhexanoate-co-3-hydroxyoctanoate-co-3-hydroxydecanoate-co-3-hydroxydodecanotate-co-3-hydroxydodecenotate.

The 3-hydroxybutyrate can be present in the copolymer in a range of about 60 to 98 weight percent, about 70 to 98 weight percent, about 80 to 98 weight percent, or about 90 to 98 weight percent.

Embodiments may have one or more of the following advantages.

In some embodiments, nucleants suitable for use with semicrystalline thermoplastics, e.g., thermoplastic polyesters, are provided, which can improve or increase the crystallization rate of the thermoplastics.

In other embodiments, a thermoplastic composition is provided, which has an improved or increased crystallization rate and/or other improved physical properties, e.g., increased mechanical strength.

In still other embodiments, an improved method of fabricating a thermoplastic composition, e.g., a composition comprising a thermoplastic polyester (e.g., PHA) and at least one nucleant described herein, is provided.

In yet other embodiments, articles that include a thermoplastic composition described herein are provided, which have improved physical and/or economic characteristics.

Other features and advantages of the invention will be apparent from the following detailed description, and from the claims.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

DETAILED DESCRIPTION

The invention provides nucleants that can be added to any thermoplastic. For example, the nucleants described herein can be added to thermoplastic polyesters, e.g., polyhydroxyalkanoates (PHA), polylactic acids (PLA), polybutylene succinates (PBS), polycaprolactones (PCL), polyethylene terephthalates (PET), PET copolymers (e.g., PET adipates, PET succinate adipates, and the like), polybutylene terephthalates (PBT), and PBT copolymers (e.g. PBT adipates, PBT succinate adipates, and the like). The nucleants described herein can also be added to polyolefins such as, for example, polypropylene. Methods for using the nucleants are also provided. The invention also includes thermoplastic compositions that include the nucleants, which can be used to create a wide array of useful articles.

I. Nucleants

The terms "nucleant(s)" and "nucleating agent(s)" refer to compounds that can be added to a thermoplastic (e.g., thermoplastic in a dissolved or melted state) to introduce one or more nucleation sites for crystallization of the thermoplastic.

In certain embodiments, the nucleant can have a nitrogen containing heteroaromatic core. Some examples of suitable heteroaromatic cores include pyridines, pyrimidines, pyrazines, pyridazine, triazines, and imidazoles. The heteroaromatic core can be substituted, for example, with polar or non-polar groups. For example, a nucleant can have one of the following formulae:

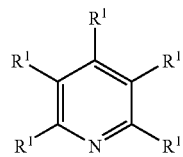
Formula 1

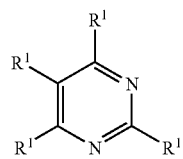
Formula 2

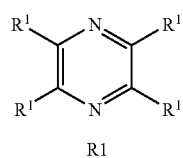
Formula 3

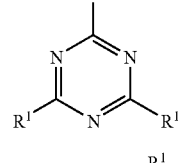
Formula 4

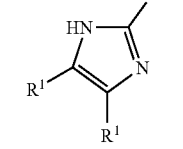
Formula 5

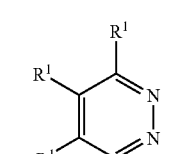
Formula 6 wherein each $R^1$ is independently H, $NR^2R^2$, $OR^2$, OH, $SR^2$, $SOR^2$, $SO_2R^2$, CN, $COR^2$, $CO_2R^2$, $CONR^2R^2$, $NO_2$, or halo (e.g., F, Cl, Br, or I); and each $R^2$ is independently H or $C_1$-$C_6$ alkyl. Exemplary species of suitable nucleating agents include, but are by no means limited to, uracil or a derivative thereof, thymine or a derivative thereof, and nitroimidazole.

In some embodiments, a nucleant can be cyanuric acid (1,3,5-triazine-2,4,6-triol; "CyA"), which has the following formula:

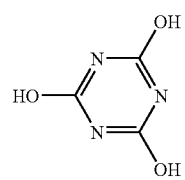

cyanuric acid

In certain embodiments, the nucleant can be at least one of basic polyvalent metal salts of cyclic organophosphoric esters of the following general formula:

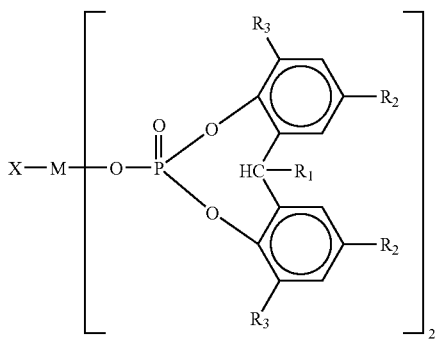

Formula 7 wherein $R_1$ represents a hydrogen atom or an alkyl group having 1 to 4 carbon atoms (e.g., methyl, ethyl, propyl, isopropyl, butyl, sec-butyl or isobutyl), $R_2$ and $R_3$ each represent a hydrogen atom or an alkyl group having 1 to 12 carbon atoms (e.g., methyl, ethyl, propyl, isopropyl, butyl, sec-butyl, tert-butyl, amyl, tert-amyl, hexyl, heptyl, octyl, isooctyl, tert-octyl, 2-ethylhexyl, nonyl, isononyl, decyl, isodecyl, undecyl, dodecyl and tert-dodecyl), M represents a group III or IV metal atom of the periodic table, and X represents HO— when M represents a group III metal atom of the periodic table and X represents O= or (HO)$_2$— when M represents a group IV metal atom of the periodic table.

For example, in certain embodiments, the nucleant can have the general formula of Formula 7, wherein X is OH, and M is Al. In such embodiments, $R_1$ can be H, $R_2$ can be t-C$_4$H$_9$, and $R_3$ can be t-C$_4$H$_9$; or $R_1$ can be H, $R_2$ can be CH$_3$, and $R_3$ can be t-C$_4$H$_9$; or $R_1$ can be CH$_3$, $R_2$ can be t-C$_4$H$_9$, and $R_3$ can be t-C$_4$H$_9$. As used herein, an "aluminum hydroxy diphosphate" (AHD) is a compound having the general formula of Formula 7, wherein X is OH, M is Al, $R_1$ is H, $R_2$ is t-C$_4$H$_9$, and $R_3$ is t-C$_4$H$_9$.

In other embodiments, the nucleant can be a compound that includes methylbenzylidene sorbitol (MBS) and/or dimethylbenzylidene sorbitol (DMBS). MBS and DMBS are commercially available, for example, from Milliken Chemicals as Millad® 3940 and 3988, respectively. Benzylidene sorbitols, such as MBS and DMBS, are known as clarifiers and have melting points above 200° C. Typically, clarifiers are mixed with a polymer (such as polypropylene) and melted (i.e., at temperatures above 200° C.). The plastic/clarifier mixture is then cooled. The clarifier crystallizes quickly during cooling, and the crystals act as nucleant for the polymer.

The typical way in which clarifiers such as MBS and DMBS are used is not compatible with certain thermoplastic polyesters, e.g., PHAs, because the temperature needed to melt MBS and DMBS is above the decomposition temperature of those thermoplastics. However, applicants have found that MBS and DMBS are effective nucleants for such thermoplastics if dispersed in the thermoplastic at a temperature below the decomposition temperature of the thermoplastic. This process makes heating the thermoplastic to the melting temperature of MBS or DMBS unnecessary.

Nucleants can be provided in a variety of forms. For example, the nucleant can be included in a dry nucleant composition, e.g., a granular or powder composition in which the particle size of the nucleant has been reduced to less than about 100 microns, e.g., less than about 10 microns, or less than about 5 microns. Alternatively, the nucleant can be included in a nucleant formulation. As used herein, a "nucleant formulation" refers to a formulation that includes a nucleant (or multiple nucleants) described herein dissolved or dispersed in a nucleant solvent. The term "nucleant solvent" means a liquid that either dissolves the nucleant or acts as a medium in which the nucleant is dispersed and that does not intolerably reduce the nucleant's effectiveness as a nucleant. Nucleant solvents for use in the invention include but are not limited to common solvents and other liquids such as plasticizers. A dry nucleant composition and nucleant formulation can optionally include one or more compound useful in the production of thermoplastics, e.g., a plasticizer, antioxidant, ultraviolet stabilizer, lubricant, pigment, flame retardant, and/or antistatic agent.

II. Thermoplastic Compositions

Nucleants can be used to form a thermoplastic composition containing one or more nucleants and one or more semicrystalline thermoplastics. Examples of thermoplastics include polyesters, acrylics, cellulosics, polyamides, polyolefins, polystyrenes, and polyvinyls. Examples of thermoplastic polyesters include, e.g., PHA, PET, polybutylene terephthalate (PBT), and various copolyesters of PET and PBT. Some such polyesters may be produced by polymerizing aliphatic diacids, diols, or hydroxy acids to produce copolyesters that are biodegradable or compostable; and various aliphatic polyesters and copolyesters derived from dibasic acids, e.g., succinic acid, glutaric acid, adipic acid, sebacic acid, azealic acid, or their derivatives, e.g., alkyl esters, acid chlorides, or their anhydrides; diols such as ethylene glycol, propylene glycol, 1,4-butanediol, 1,6-hexanediol, or 1,4-cyclohexanedimethanol, or their cyclic oxides such as ethylene oxide, propylene oxide, or THF; lactic acid or lactide, or glycolic acid or glycolide.

Methods for making and using thermoplastic compositions are well known to those of skill in the art. Skilled practitioners will appreciate that the nucleants of the present invention can be used with these and any other thermoplastic (or mixtures of such thermoplastics, e.g., mixtures of at least two, e.g., at least three, four, five, seven, or ten thermoplastics), regardless of whether the thermoplastic is natural or synthetic, or biodegradable or non-biodegradable. Further, as is known to skilled practitioners, a thermoplastic composition can contain one or more additive, e.g., a filler, plasticizer, antioxidant, ultraviolet stabilizer, lubricant or slip agent, pigment, transesterification catalyst or other cross linking agent, flame retardant, and/or antistatic agent.

The thermoplastics may be homopolymers, copolymers, or any combination of homopolymers and copolymers, e.g., two homopolymers, two copolymers, or one homopolymer and one copolymer. The term "homopolymer" refers to polymers having the same monomer units. The term "copolymer" refers to polymers having two or more different monomer units (also referred to herein as comonomers or comonomer units) and includes, e.g., alternating, block, and random copolymers.

The nucleants of the invention are suitable for use with PHAs. Examples of PHA monomer units include 3-hydroxybutyrate, 3-hydroxypropionate, 3-hydroxyvalerate, 3-hydroxyhexanoate, 3-hydroxyheptanoate, 3-hydroxyoctanoate, 3-hydroxynonaoate, 3-hydroxydodecanoate, 3-hydroxydodecenoate, 3-hydroxytetradecanoate, 3-hydroxyhexadecanoate, 3-hydroxyoctadecanoate, 3-hydroxy-4-pentenoate, 4-hydroxybutyrate, 4-hydroxyvalerate, 5-hydroxyvalerate, and 6-hydroxyhexanoate.

The PHA can be a homopolymer (i.e., all monomer units are the same). Examples of PHA homopolymers include poly 3-hydroxyalkanoates (e.g., poly 3-hydroxypropionate, poly 3-hydroxybutyrate, poly 3-hydroxyhexanoate, poly 3-hydroxyheptanoate, poly 3-hydroxyoctanoate, poly 3-hydroxydecanoate, poly 3-hydroxydodecanoate), poly 4-hydroxyalkanoates (e.g., poly 4-hydroxybutyrate), poly 5-hydroxyalkanoates (e.g., poly 5-hydroxypentanoate), and poly 6-hydroxyalkanoates (e.g., poly 6-hydroxyhexanoate).

In certain embodiments, the PHA can be a copolymer (i.e., the PHA can contain two or more different monomer units). Examples of PHA copolymers include poly 3-hydroxybutyrate-co-3-hydroxypropionate, poly 3-hydroxybutyrate-co-4-hydroxybutyrate, poly 3-hydroxybutyrate-co-4-hydroxypentenoate, poly 3-hydroxybutyrate-co-3-hydroxyvalerate, poly 3-hydroxybutyrate-co-3-hydroxyhexanoate, poly 3-hydroxybutyrate-co-4-hydroxyvalerate, poly 3-hydroxybutyrate-co-6-hydroxyhexanoate, poly 3-hydroxybutyrate-co-3-hydroxyheptanoate, poly 3-hydroxybutyrate-co-3-hydroxyoctanoate, poly 3-hydroxybutyrate-co-3-hydroxydecanoate, poly 3-hydroxybutyrate-co-3-hydroxydodecanotate, poly 3-hydroxybutyrate-co-3-hydroxyoctanoate -co-3-hydroxydecanoate, poly 3-hydroxydecanoate-co-3-hydroxyoctanoate, and poly 3-hydroxybutyrate-co-3-hydroxyoctadecanoate. Although examples of PHA copolymers having two different monomer units have been provided, the PHA can have more than two different monomer units (e.g., three different monomer units (e.g., poly 3-hydroxybutyrate-co-3-hydroxyvalerate-co-3-hydroxyhexanoate, wherein the 3-hydroxybutyrate component is at least about 70 weight percent, e.g., at least about 80 weight percent, at least about 90 weight percent, or at least about 96 weight percent of the total polymer), four different monomer units, five different monomer units, six different monomer units (e.g., poly 3-hydroxybutyrate-co-3-hydroxyhexanoate-co-3-hydroxyoctanoate-co-3-hydroxydecanoate-co-3-hydroxydodecanotate-co-3-hydroxydodecenotate wherein the 3-hydroxybutyrate component is at least about 80 weight percent, e.g., at least about 90 weight percent, or at least about 96 weight percent of the total polymer), seven different monomer units, eight different monomer units, nine different monomer units, ten different monomer units, or more than ten different monomer units).

PHAs can be derived from biomass, such as plant biomass and/or microbial biomass (e.g., bacterial biomass, yeast biomass, fungal biomass). Biomass-derived PHA can be formed, for example, via enzymatic polymerization of the monomer units. The biomass can be formed of one or more of a variety of entities. Such entities include, for example, microbial strains for producing PHAs (e.g., *Alcaligenes eutrophus* (renamed as *Ralstonia eutropha*), *Bacillus, Alcaligenes latus, Azotobacter, Aeromonas, Comamonas, Pseudomonads*), genetically engineered organisms, for producing PHAs (e.g., *Pseudomonas, Ralstonia, Escherichia coli, Klebsiella*), yeasts for producing PHAs, and plant systems for producing PHAs. Such entities are disclosed, for example, in Lee, *Biotechnology & Bioengineering* 49:1-14 (1996); Braunegg et al., (1998), J. Biotechnology 65: 127-161; Madison, L. L. and Huisman, G. W. (1999), Metabolic Engineering of Poly(3-Hydroxyalkanoates): From DNA to Plastic. Microbiol. Mol. Biol. Rev. 63, 21-53; and Snell and Peoples 2002, Metabolic Engineering 4: 29-40, which are hereby incorporated by reference.

Alternatively, the PHA can be derived by chemical synthesis, such as by the ring opening polymerization of β-lactone monomers using various catalysts or initiators such as aluminoxanes, distannoxanes, or alkoxy-zinc and alkoxy-aluminum compounds (see Agostini, D. E. et al. *Polym. Sci.*, Part A-1, 9: 2775-2787 (1971); Gross, R. A. et al., *Macromolecules* 21:2657-2668 (1988); Dubois, P. I. et al., *Macromolecules,* 26:4407-4412 (1993); LeBorgne, A. and Spassky, N. *Polymer,* 30:2312-2319 (1989); Tanahashi, N. and Doi, Y. *Macromolecules,* 24:5732-5733 (1991); Hori, Y. M. et al., *Macromolecules,* 26:4388-4390 (1993); Kemnitzer, J. E. et al., *Macromolecules,* 26:1221-1229 (1993); Hori, Y. M. et al., *Macromolecules,* 26:5533-5534 (1993); Hocking, P. J. and Marchessault, R. H., *Polym Bull.,* 30:163-170 (1993). The PHA can also be obtained by condensation polymerization of esters (see Hubbs, J. C. and Harrison, M. N. U.S. Pat. No. 5,563, 239) or by chemoenzymatic methods (see Xie, et al., *Macromolecules,* 30:6997-6998 (1997)).

The nucleants are also suitable for use with PLA and polyglycolic acid. PLA and polyglycolic acid are often prepared by either condensation polymerization of the free acids or by catalytic, ring-opening polymerization of the dilactones. PLA and polyglycolic acid are biodegradable and degrade to lactic acid and glycolic acid, respectively.

The nucleants are also suitable for use with other biodegradable polymers, including PBS, polybutylene succinate adipate (PBSA), and mixtures thereof. A PBS polymer is generally prepared by the condensation polymerization of a glycol and a dicarboxylic acid or an acid anhydride thereof. A PBS polymer may either be a linear polymer or a long-chain branched polymer. A long-chain branched PBS polymer is generally prepared by using an additional polyfunctional component selected from the group consisting of trifunctional or tetrafunctional polyols, oxycarboxylic acids, and polybasic carboxylic acids. A PBSA polymer is generally prepared by the polymerization of at least one alkyl glycol and more than one aliphatic multifunctional acid.

The nucleants are also suitable for use with PCL. PCL is a biodegradable synthetic aliphatic polyester and is generally made by the ring-opening polymerization of caprolactone. PCL may be obtained from any commercial source, e.g., Union Carbide (UCC).

The nucleants can also be used with PET and/or PET that is modified to be biodegradable ("modified PET"). PET is commonly prepared by the reaction of ethylene glycol with a terephthalate ester such as dimethyl terephthalate or, occasionally, with terephthalic acid. Modified PET is PET that contains co-monomers, e.g., ether, amide, or aliphatic monomers, which provide one or more linkages susceptible to hydrolysis. An example of a commercially available modified PET is Biomax™, available from DuPont. Examples of modified PBTs include polybutylene adipate/terephthalate (PBAT) and polytetramethylene adipate/terephthalate (PTMAT). Examples of commercially available PBTs are Ecoflex™ available from BASF, and Eastar™, available from Eastman Chemical Company.

The nucleants of the present invention may also be used with polyolefins. Any polyolefin capable of being fabricated into an article, such as a microfiber, is suitable for use in the present invention. Exemplary polyolefins are homopolymers and copolymers comprising repeating units formed from one or more aliphatic hydrocarbons, including ethylene, propylene, butene, pentene, hexene, heptene, octene, 1,3-butadiene, and 2-methyl-1,3-butadiene. The polyolefins may be high or low density and may be generally linear or branched chain polymers. Methods of forming polyolefins such as polypropylene are known to those skilled in the art.

III. Production and Processing of Thermoplastic Compositions

Thermoplastic compositions can be produced using any art-known method that includes adding a nucleant to a thermoplastic. The nucleant can be added to a thermoplastic as a dry nucleant composition and/or as a nucleant formulation. If the nucleant is added as a dry nucleant composition, e.g., as granules or as powder, the particle size is not critical from the standpoint of the qualitative effect on nucleation. In general, however, small particle size (e.g., less than about 100 microns) allows intimate mixing and thorough distribution within a thermoplastic. Particle size of the nucleant can be minimized to ensure uniform dispersion in the polymer and a sufficient number of nucleation sites. For example, U.S. Pat. No. 5,973,100 indicates that nucleation can occur if the particle size of a nucleant is below about 700 microns and increases in efficacy as the particle size is further reduced. For qualitative evaluation of the effectiveness of a chemical species in nucleating a polymer, a high loading (e.g., greater than 1 weight percent) of nucleant with a relatively large particle size is adequate. In commercially useful polymer formulations, further reduction in the particle size of the nucleant can increase the nucleant efficacy and can minimize defects and flaws in the polymer. For high effectiveness, particle size below about 5 microns, e.g., below about 2 microns, can be used. Reduction of the particle size of the nucleant is typically achieved by mechanical methods, such as grinding.

The nucleants can be added to a thermoplastic prior to, during, and/or after melting or dissolving the thermoplastic, using any art-known mixing means, e.g., by mechanically admixing nucleants and thermoplastics (e.g., by stirring, shaking, or subjecting the mixture to ultrasound). For example, a solvent dispersion process can be employed. In such a process, thermoplastic is dissolved in a solvent and nucleant is dispersed therein, e.g., by agitating the mixture, to form a homogeneous thermoplastic/nucleant mixture. In another process, a thermoplastic is melted and the nucleant is dispersed therein under high sheer. In still another process, nucleant is dispersed in a liquid carrier, e.g., a plasticizer, and mixed with a thermoplastic, e.g., a thermoplastic dissolved in a solvent or in a melted state.

The nucleant is combined with the thermoplastic in an amount effective to increase the crystallization rate and/or final crystallinity of the thermoplastic, e.g., as reflected by an increased temperature of crystallization by differential scanning calorimetry (DSC). Skilled practitioners will appreciate that a nucleant of the present invention can be added to a thermoplastic in any desired amount. Optimal amounts to be added will depend on various factors known to skilled practitioners, e.g., cost, desired physical characteristics of the thermoplastic (e.g., mechanical strength), and the type of processing being performed (raising, e.g., considerations of line speeds, cycle times, and other processing parameters). Also to be considered is whether the thermoplastic composition includes other additives, e.g., plasticizers, stabilizers, pigments, fillers, reinforcing agents, and/or mold release agents. In general, however, a nucleant can be included in a thermoplastic composition such that the composition contains about 0.005% by weight to about 20%, e.g., about 0.05% to about 10%, about 0.5% to about 5% nucleant, based on the total weight of the composition. In certain embodiments of the present invention, the composition contains about 1% to about 10%, e.g., about 1% to about 5% nucleant. In certain embodiments, the composition contains about 0.1% to about 2.0% nucleant.

Without wishing to be bound by theory, it is believed that the nucleants of the present invention can exert their effect, for example, when a thermoplastic composition is heated to a temperature above the crystalline melting point of the thermoplastic and then cooled to a temperature below the crystalline melting point of the thermoplastic. It is within the skilled practitioner's abilities to select the optimum rate of cooling of the composition from a temperature above the crystalline melting point to temperatures below such point. In selecting the optimum rate of cooling, skilled practitioners may consider the kind of thermoplastic and nucleant employed, the amount of nucleant present in the composition, and the crystalline structure desired in the thermoplastic product. Thermoplastic compositions nucleated in accordance with this invention may crystallize at higher rates (e.g., due to more centers of nucleation) than do otherwise similar compositions that do not include an added nucleant.

Optionally, an additive can be included in the thermoplastic composition. The additive can be any compound known to those of skill in the art to be useful in the production of thermoplastics. Exemplary additives include, e.g., plasticizers (e.g., to increase flexibility of a thermoplastic composition), antioxidants (e.g., to protect the thermoplastic composition from degradation by ozone or oxygen), ultraviolet stabilizers (e.g., to protect against weathering), lubricants (e.g., to reduce friction), pigments (e.g., to add color to the thermoplastic composition), clarifiers, flame retardants, fillers, and antistatic agents. It is well within the skilled practitioner's abilities to determine whether an additive should be included in a thermoplastic composition and, if so, the amount that should be added to the composition.

For the fabrication of useful articles, a thermoplastic composition can be created at a temperature above the crystalline melting point of the thermoplastic but below the decomposition point of at least one (e.g., all) of the ingredients of the composition. Alternatively, a pre-made thermoplastic composition of the present invention is simply heated to such temperature. While in molten condition, the composition is processed into a desired shape, e.g., a fiber, filament, film, sheet, rod, tube, or other shape. Such processing can be performed using any art-known technique, e.g., extrusion, injection molding, compression molding, blow molding, film blowing, fiber spinning, blown fiber, spun bonded fiber coextrusion, paper coating, calendering, rotational molding, casting, or thermoforming. The articles so formed are subsequently cooled to set the shape and induce crystallization.

The thermoplastic compositions of the present invention can be used to create a wide variety of useful articles, e.g., automotive, consumer disposable (including hygiene articles, wet wipes and disposable medical products), consumer durable, construction, electrical, medical, and packaging articles. Such articles are also within the present invention.

For example, the article can be a film. A film is an extremely thin continuous piece of a substance having a high length to thickness ratio and a high width to thickness ratio. The film can be liquid impervious. Such films can be included in a variety of disposable products including, e.g., sanitary garments, e.g., disposable diapers, feminine hygiene products (such as an intralabial device) and the like, shrink-wrapping (e.g., food wraps, consumer product wraps, pallet and/or crate wraps, and the like), or bags (grocery bags, food storage bags, sandwich bags, garbage bags, and the like).

The article can be a sheet. A sheet is a very thin continuous piece of a substance, having a high length to thickness ratio and a high width to thickness ratio, wherein the material is thicker than 0.254 mm. Sheeting shares many of the same characteristics as film in terms of properties and manufacture, with the exception that sheeting is stiffer, and has a self-supporting nature. Such differences in stiffness and support result in some modification of the manufacturing methods.

The article can be a fiber. A fiber is a flexible, homogeneous body having a high length-to-width ratio and a small cross section. Fibers are useful, e.g., as textiles in yarns for garments. Fibers are also useful for manufacturing lightweight fibrous materials useful in agricultural applications to protect, promote, or control plant growth. Fibers are also useful for making non-woven articles such as wet wipes or components of diapers and feminine hygiene articles. They are also useful to make green house thermal screens, crop row covers, turf covers, weed barriers and hydroponic articles.

The article can be a foam. A foam is a thermoplastic whose apparent density has been substantially decreased by the presence of numerous cells distributed throughout its bulk. Foams can be used to make, e.g., packaging (e.g., hot and cold food packaging containers), cushioning (e.g., comfort cushioning and packing material), insulation, and structural components.

The article can be a molded article. A molded article is an article formed from thermoplastic polyesters that are, for example, injected, compressed, or blown by means of a gas into shape defined by a female mold. These objects can be solid objects like toys, or hollow like bottles and containers.

The article can be a nonwoven. A nonwoven is a porous, textile like material, usually in flat sheet form, composed primarily, or entirely, of fibers assembled in webs that are manufactured by processes other than spinning, weaving, or knitting.

The article can be an elastomer. An elastomer is a material that exhibits both long-range deformability on application of stress and essentially complete recovery on removal. Elastomers can also be used in blend formulations with other polymers (or copolymers) to increase impact strength and toughness in stiffer materials.

The article can be an adhesive. An adhesive is a material that joins two other materials, called adherends, together. Thermoplastic compositions may be processed into a variety of adhesives, including, e.g., hot melt, solution, dispersion and pressure sensitive adhesives.

The article can be a disposable personal care product. For example, the article can be a compostable absorbent article comprising a liquid pervious topsheet, a liquid impervious backsheet that includes a film described herein, and an absorbent core positioned between the topsheet and backsheet. Such articles include infant diapers, adult incontinent briefs and pads, and feminine hygiene pads and liners. Additional personal care products that can include the thermoplastics of the present invention include personal cleansing wipes; disposable health care products such as bandages, wound dressings, wound cleansing pads, surgical gowns, surgical covers, surgical pads; and other institutional and health care disposables, such as gowns, wipes, pads, and bedding items (e.g., sheets, pillowcases, and foam mattress pads).

In some embodiments, the thermoplastic compositions of the present invention can be used, e.g. for blending with other materials including thermoplastic starches, polyglycolic acid polymers, polyvinyl alcohol polymers, polylactic acid polymers, cellulosic materials or synthetic biodegradable polymers.

The invention will be further described in the following examples, which do not limit the scope of the invention defined by the claims.

EXAMPLES

Example 1

Use of Cyanuric Acid, AHD, MBS, and DMBS as Nucleants

Methods

Example 1 demonstrates that cyanuric acid is an effective nucleator of poly 3-hydroxybutyrate (P3HB), poly 3-hydroxybutyrate-co-11%-4-hydroxybutyrate (P3HB-co-11-4HB), poly 3-hydroxybutyrate-co-5%-3-hydroxyhexanoate (P3HB-co-5-3HH), poly 3-hydroxybutyrate-co-8%-3-hydroxyvalerate (P3HB-co-8-3HV), poly 4-hydroxybutyrate (P4HB), PLA, PET, and polypropylene. The Example also demonstrates that AHD nucleates P3HB-co-11-4HB. Further, the Example demonstrates that MBS and DMBS nucleate P3HB-co-11-4HB.

Cyanuric acid (CAS # [108-80-5], 1,3,5-triazine-2,4,6-triol) was reagent grade (98%, mp >360° C., from Aldrich Chemical). AHD was separated from commercial NA-21 (Amfine Chemicals) by stirring 4 grams of NA-21 in 100 ml of reagent grade methanol for several hours. The slurry was filtered and washed with methanol. The remaining solid was dried in vacuo at 65° C. The supernatant was evaporated on a hotplate followed by drying in vacuo at 65° C. to yield a white solid. DSC analysis showed that the complete absence of melting endotherms of 94 and 216° C. (carboxylate salt plus free carboxylic acid) and no additional melting up to 300° C. This indicates complete removal of added components. Benzylidene sorbitol (BS; Millad 3905), MBS (Millad 3940) and DMBS (Millad 3988) was obtained from Milliken Chemical. Boron nitride, Grade NX1, was obtained from GE Advanced Ceramics (Cleveland, Ohio).

Polymer films containing nucleant were prepared by either a solution method (Method A) or melt blending (Method B), as described below.

Polymer samples (ca. 10 mg) were analyzed by Differential Scanning Calorimetry (TA Instruments, Inc. DSC Model Q100) using the following temperature program: Heat at 50° C./min to Tmax. Hold for 3 minutes. Cool at 10° C./minute to 0° C. (except for P4HB, which was cooled to −70 C). The thermograms were analyzed with TA Universal Analysis software. Tmax is 200° C for P3HB, P3HB-co-8-3HV and P3HB-co-5-3HH, 185° C. for P3HB-co-11-4HB, 125° C. for P4HB, and 280° C. for PET. The shift of peak temperature of the crystallization exotherm is taken as a measure of the effectiveness of a given nucleant. The greater the upward shift in temperature, the more effective the nucleant.

Method A:

Polymer films containing nucleant were prepared by mixing 8 grams of a 2.5% (w/w) solution of polymer in reagent grade Chloroform with 4mg of nucleant. The mixture was ultrasonically dispersed (Heat Systems, Inc, Ultrasonic Processor XL) using a power level of 5 for 2 minutes (5 seconds on, 1 second off). The dispersion was poured into 10 cm diameter Aluminum dishes and allowed to air dry followed by overnight removal of the last traces of solvent at about 65° C. under vacuum.

Method B:

Two grams of dried polymer and 20 mg of ground nucleant were mixed at 270° C. for 4 minutes in a small scale heated melt mixer (Model LMM, Laboratory Mixing Molder, Atlas Electric Devices, Chicago, Ill.).

Results

The results obtained are summarized in Table 1, below. Control experiment 1 shows the crystallization of P3HB polymer. The addition of boron nitride (commonly known as the best available nucleant for PHB), Control 2, results in a significant increase in the peak exotherm temperature to 107.6 from 62.8° C. Experimental example 1 shows that cyanuric acid increases the crystallization exotherm to an even higher 118.4° C.

Control 3 shows the crystallization of P3HB-co-11-4HB copolymer. The addition of boron nitride (Control 4) shows that it does not have any significant effectiveness in nucleating these copolymers. Experimental examples 2 through 6 show four effective nucleants, cyanuric acid, AHD, MBS and DMBS.

Control experiment 5 shows the crystallization of P3HB-co-5-3HH copolymer. Control experiment 6 shows this polymer nucleated with boron nitride. Experimental example 7, with cyanuric acid, shows an almost 50° C. increase in peak exotherm temperature and that it is more effective than boron nitride.

Control experiments 7 and 8 show the crystallization of P3HB-co-8-3HV copolymer and nucleated with boron nitride, respectively. Experimental example 8 shows that cyanuric acid is, again, even more effective with this polymer.

Control experiment 9 and Experimental example 9 show that cyanuric acid is an effective nucleant for P4HB.

Control experiment 10 and Experimental example 10 show that cyanuric acid is an effective nucleant for PET.

Control experiment 11 and Experimental example 11 show that cyanuric acid is an effective nucleant for PLA, and is more effective than boron nitride.

Control experiment 13 and Experimental example 12 show that cyanuric acid nucleates polypropylene.

TABLE 1

Evaluation of Nucleants in Thermoplastics

| Experiment | Polymer | Method | Nucleant | Tcr* |
|---|---|---|---|---|
| CONTROL 1 | P3HB | A | none | 62.8 |
| CONTROL 2 | P3HB | A | BN | 107.6 |
| EXAMPLE 1 | P3HB | A | CyA | 118.4 |
| CONTROL 3 | P3HB-co-11-4HB | A | none | none |
| CONTROL 4 | P3HB-co-11-4HB | A | BN | none |
| EXAMPLE 2 | P3HB-co-11-4HB | A | CyA | 69.7 |
| EXAMPLE 3 | P3HB-co-11-4HB | A | AHD | 58.9 |
| EXAMPLE 4 | P3HB-co-11-4HB | A | BS | none |
| EXAMPLE 5 | P3HB-co-11-4HB | A | MBS | 63.8 |
| EXAMPLE 6 | P3HB-co-11-4HB | A | DMBS | 40.7 |
| CONTROL 5 | P3HB-co-5-3HH | A | none | 49.7 |
| CONTROL 6 | P3HB-co-5-3HH | A | BN | 78.3 |
| EXAMPLE 7 | P3HB-co-5-3HH | A | CyA | 99.0 |
| CONTROL 7 | P3HB-co-8-3HV | A | none | 66.9 |
| CONTROL 8 | P3HB-co-8-3HV | A | BN | 92.5 |
| EXAMPLE 8 | P3HB-co-8-3HV | A | CyA | 102.3 |
| CONTROL 9 | P4HB | A | none | 10.5 |
| EXAMPLE 9 | P4HB | A | CyA | 15.6 |
| CONTROL 10 | PET | none | none | 208.3 |
| EXAMPLE 10 | PET | B | CyA | 212.7 |
| CONTROL 11 | PLA | | none | none |
| CONTROL 12 | PLA | A | BN | 95.6 |
| EXAMPLE 11 | PLA | A | CyA | 102.3 |
| CONTROL 13 | Polypropylene | B | none | 118.8 |
| EXAMPLE 12 | Polypropylene | B | CyA | 120.8 |

*Tcr is the peak temperature for crystallization during cooling.

Other embodiments are within the scope of the following claims.

What is claimed is:

1. A method of increasing the crystallization rate of a thermoplastic polyester composition, comprising:
    cooling a composition comprising a thermoplastic polyester and a nucleant from a temperature above the crystalline melting point of the thermoplastic polyester to a temperature below the crystalline melting point of the thermoplastic polyester, wherein the nucleant is a compound represented by the following chemical formula:

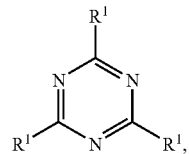

Formula 4 wherein each $R^1$ is independently H, $NR^2R^2$, OH, $OR^2$, $SR^2$, $SOR^2$, $SO_2R^2$, CN, $COR^2$, $CO_2R^2$, $CONR^2R^2$, $NO_2$, F, Cl, Br, or I; each $R^1$ in Formula 4 is independently H, OH, $OR^2$, $SR^2$, $SOR^2$, $SO_2R^2$, CN, $COR^2$, $CO_2R^2$, $CONR^2R^2$, $NO_2$, F, Cl, Br, or I; and
    allowing the thermoplastic polyester to crystallize.

2. The method of claim 1, wherein the thermoplastic polyester comprises an aliphatic polyester.

3. The method of claim 2, wherein the aliphatic polyester is selected from the group consisting of polybutylene succinates, polycaprolactones, polyhydroxyalkanoates, polyglycolic acids, polylactic acids, and combinations thereof.

4. The composition of claim 2, wherein the aliphatic polyester is a polyhydroxyalkanoate.

5. The method of claim 4, wherein the polyhydroxyalkanoate is a polyhydroxyalkanoate homopolymer selected from the group consisting of poly-3-hydroxybutyrate, polylactic acid, polyglycolic acid, and poly-4-hydroxybutyrate.

6. The method of claim 5, wherein the polyhydroxyalkanoate is poly-3-hydroxybutyrate.

7. The method of claim 4, wherein the polyhydroxyalkanoate is a copolymer of 3-hydroxybutyrate and at least one co-monomer selected from the group consisting of 3-hydroxypropionate, 3-hydroxyvalerate, 3-hydroxyhexanoate, 3-hydroxyheptanoate, 3-hydroxyoctanoate, 3-hydroxynonaoate, 3-hydroxydecanoate, 3-hydroxydodecanoate, 3-hydroxydodecenoate, 3-hydroxytetradecanoate, 3-hydroxyhexadecanoate, 3-hydroxyoctadecanoate, 3-hydroxy-4-pentenoate, 4-hydroxybutyrate, 4-hydroxyvalerate, 5-hydroxyvalerate, and 6-hydroxyhexanoate.

8. The method of claim 7, wherein the copolymer is poly 3-hydroxybutyrate-co-3-hydroxypropionate, poly 3-hydroxybutyrate-co-4-hydroxybutyrate, poly 3-hydroxybutyrate-co-3-hydroxyvalerate, poly 3-hydroxybutyrate-co-3-hydroxyhexanoate, poly 3-hydroxybutyrate-co-3-hydroxyvalerate-co-3-hydroxyhexanoate, or poly 3-hydroxybutyrate-co-3-hydroxyhexanoate-co-3-hydroxyoctanoate-co-3-hydroxydecanoate-co-3-hydroxydodecanoate-co-3-hydroxydodecenotate.

9. The method of claim 8, wherein the copolymer is poly 3-hydroxybutyrate-co-4-hydroxybutyrate.

10. The method of claim 7, wherein the 3-hydroxybutyrate is present in the copolymer in a range of about 60 to 98 weight percent, about 70 to 98 weight percent, about 80 to 98 weight percent, or about 90 to 98 weight percent.

11. The method of claim 2, wherein the aliphatic polyester is polybutylene succinate or polybutylene succinate adipate.

12. The method of claim 1, wherein the thermoplastic polyester comprises an aromatic polyester.

13. The method of claim 12, wherein the aromatic polyester comprises a polyethylene terephthalate.

14. The method of claim 13, wherein the polyethylene terephthalate comprises a co-monomer.

15. The method of claim 14, wherein the co-monomer is an ether or amide or aliphatic monomer.

16. The method of claim 12, wherein the aromatic polyester is a polybutylene adipate/terephthalate or a polymethylene adipate/terephthalate.

17. The method of claim 1, wherein the nucleant is cyanuric acid.

18. The method of claim 4, wherein the nucleant is cyanuric acid.

19. The method of claim 6, wherein the nucleant is cyanuric acid.

20. The method of claim 9, wherein the nucleant is cyanuric acid.

* * * * *